(12) United States Patent
Mishra et al.

(10) Patent No.: US 12,481,901 B2
(45) Date of Patent: Nov. 25, 2025

(54) ELECTRONIC DEVICE AND CONTROL METHOD THEREOF

(71) Applicant: Samsung Electronics Co., Ltd., Suwon-si (KR)

(72) Inventors: Abhishek Mishra, Greater Noida (IN); Sai Hemanth Kasaraneni, Macherla (IN); Manali Arora, Delhi (IN); Manas Ranjan Sahoo, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 992 days.

(21) Appl. No.: 17/499,257

(22) Filed: Oct. 12, 2021

(65) Prior Publication Data
US 2022/0101163 A1 Mar. 31, 2022

Related U.S. Application Data

(63) Continuation of application No. PCT/KR2021/013283, filed on Sep. 28, 2021.

(30) Foreign Application Priority Data

Sep. 30, 2020 (IN) .............................. 202041042555
Aug. 5, 2021 (KR) ......................... 10-2021-0103061

(51) Int. Cl.
*G06F 3/0481* (2022.01)
*G06F 18/2113* (2023.01)
(Continued)

(52) U.S. Cl.
CPC ........... *G06N 7/01* (2023.01); *G06F 18/2113* (2023.01); *G06F 18/2415* (2023.01);
(Continued)

(58) Field of Classification Search
CPC ... G06N 7/01; G06F 18/2113; G06F 18/2415; G06F 3/0481; G06V 10/768
See application file for complete search history.

(56) References Cited

U.S. PATENT DOCUMENTS 8,626,141 B2 1/2014 Davies-Moore et al.
8,934,719 B1 1/2015 Denise
(Continued)

FOREIGN PATENT DOCUMENTS

JP 2014-164599 A 9/2014
JP 2018-197936 A 12/2018
(Continued)

OTHER PUBLICATIONS

International Search Report Dated Jan. 19, 2022, issued in International Application No. PCT/KR2021/013283.
(Continued)

*Primary Examiner* — Keith D Bloomquist
(74) *Attorney, Agent, or Firm* — Jefferson IP Law, LLP

(57) ABSTRACT

An electronic device is provided. The electronic device includes a memory, a user interface, and at least one processor. The at least one processor is configured to determine an optimal domain from a plurality of domains based on a current context, combine the current context and a historical context of the optimal domain to determine a combined context, determine an optimal feature from a plurality of features based on the combined context and a parameter of the optimal domain, and control the user interface to output a recommendation message for the optimal feature.

12 Claims, 15 Drawing Sheets

(51) Int. Cl.
*G06F 18/2415* (2023.01)
*G06N 7/01* (2023.01)
*G06V 10/70* (2022.01)
*G06F 9/451* (2018.01)

(52) U.S. Cl.
CPC .......... *G06V 10/768* (2022.01); *G06F 3/0481* (2013.01); *G06F 9/453* (2018.02)

(56) References Cited

U.S. PATENT DOCUMENTS

| | | |
|---|---|---|
| 9,218,574 B2 | 12/2015 | Phillipps et al. |
| 9,974,045 B2 | 5/2018 | Ghosh et al. |
| 10,402,732 B2 | 9/2019 | Sakata et al. |
| 11,354,143 B2 | 6/2022 | Tak et al. |
| 11,556,354 B2 | 1/2023 | Lee et al. |
| 2002/0016786 A1* | 2/2002 | Pitkow ................. G06F 16/9562 |
| 2011/0200980 A1 | 8/2011 | Takahashi et al. |
| 2013/0132896 A1* | 5/2013 | Lee ....................... G06F 16/907 715/846 |
| 2013/0198506 A1* | 8/2013 | Smith ................... G06F 1/1684 713/100 |
| 2016/0174046 A1 | 6/2016 | Wilden et al. |
| 2018/0189077 A1* | 7/2018 | Gupta .................. G06F 9/453 |
| 2018/0203860 A1* | 7/2018 | Mowatt ................ G06Q 30/016 |
| 2018/0352091 A1* | 12/2018 | Puri ..................... H04M 7/0036 |
| 2019/0129615 A1* | 5/2019 | Sundar ................. G06F 9/451 |
| 2020/0045163 A1 | 2/2020 | Hwang et al. |
| 2020/0097340 A1* | 3/2020 | Balik .................... G06F 9/542 |
| 2020/0159862 A1 | 5/2020 | Kleiner et al. |
| 2021/0004682 A1* | 1/2021 | Gong .................... G06N 3/08 |
| 2021/0240770 A1* | 8/2021 | Kleiner ................ G06F 16/908 |
| 2022/0043964 A1* | 2/2022 | Stenerson ............ G06F 3/0481 |

FOREIGN PATENT DOCUMENTS

| | | |
|---|---|---|
| KR | 10-2013-0035660 A | 4/2013 |
| KR | 10-2015-0019368 A | 2/2015 |
| KR | 10-2015-0068175 A | 6/2015 |
| KR | 10-2017-0094995 A | 8/2017 |
| KR | 10-2019-0069964 A | 6/2019 |
| KR | 10-2020-0095889 A | 8/2020 |

OTHER PUBLICATIONS

Indian Office Action Dated Apr. 5, 2022, issued in Indian Application No. 202041042555.
Extended European Search Report dated Nov. 21, 2023, issued in European Patent Application No. 21876008.0.
European Office Action dated Jun. 26, 2024, issued in European Patent Application No. 21 876 008.0.

* cited by examiner

ELECTRONIC DEVICE AND CONTROL METHOD THEREOF

CROSS-REFERENCE TO RELATED APPLICATION(S)

This application is a continuation application, claiming priority under § 365(c), of an International application No. PCT/KR2021/013283, filed on Sep. 28, 2021, which is based on and claims the benefit of an Indian patent application number 202041042555, filed on Sep. 30, 2020, in the Indian Intellectual Property Office and of a Korean patent application number 10-2021-0103061, filed on Aug. 5, 2021, in the Korean Intellectual Property Office, the disclosure of each of which is incorporated by reference herein in its entirety.

TECHNICAL FIELD

The disclosure relates to an electronic device capable of recommending a feature to a user and a control method thereof.

BACKGROUND ART

In general, electronic devices may access a large quantity of information and services through an Internet and from other sources. Functionality of the electronic devices are increasing rapidly, and the electronic devices, such as smartphones, tablets, and computers, are capable of running applications that perform different tasks and provide different types of information.

Further, each application has various features. However, many of features may be hard to learn or overwhelming for users, and difficult to master all the features. In addition, the user may have difficulty even in discovering what features and/or information is available on the electronic devices' applications.

Further, some of the existing systems provide feature recommendations to the user, but often many features are not recommended when the user needs them or recommended when the user does not need them. There is no mechanism in the existing systems to recognize intention/behavior of the user and to enhance the probability of recommendation of the optimal feature.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic device capable of analyzing user's current behavior as well as historical behavior so as to enhance a probability of recommendation of features that are contextually relevant and capable of efficiently displaying the features to a user to improve user experience and utilize the enhancement of the features, and a control method thereof.

Technical Solution

Additional aspects will be set forth in part in the description which follows and, in part, will be apparent from the description, or may be learned by practice of the presented embodiments.

In accordance with an aspect of the disclosure, an electronic device is provided. The electronic device includes a memory, a user interface, and at least one processor. The at least one processor is configured to determine an optimal domain from a plurality of domains based on a current context, configured to combine the current context and a historical context of the optimal domain to determine a combined context, configured to determine an optimal feature from a plurality of features based on the combined context and a parameter of the optimal domain, and configured to control the user interface to output a recommendation message for the optimal feature.

The at least one processor may be configured to determine a probability of each of the plurality of features based on the combined context and the parameter of the optimal domain, and configured to determine a feature, which has a highest probability among features having a probability higher than a threshold value, as the optimal feature.

The at least one processor may be configured to determine the parameter of the optimal domain based on the combined context and the optimal domain.

The at least one processor may be configured to distinguish at least one unused feature that corresponds to the optimal domain from the plurality of features and has no usage history, configured to redistribute a probability of each of the plurality of features to determine a probability of the at least one unused feature, and configured to determine an unused feature, which has a highest probability among unused features having a probability higher than the threshold value, as the optimal feature.

The at least one processor may be configured to determine the feature, which has the highest probability among the plurality of features, as the optimal feature in response to determining that a probability of at least one feature from the plurality of features is higher than the threshold value, configured to update the probability of each of the plurality of features based on a past optimal feature, which is previously recommended, in response to determining that the plurality of features is lower than the threshold value, and configured to determine the feature having the highest probability as the optimal feature.

The at least one processor may be configured to determine at least one of an image output mode, a text output mode, or an audio output mode as an optimal mode based on the optimal feature and user-specific parameters, and configured to control the user interface to output a recommendation message for the optimal feature according to the optimal mode.

The user specific-parameters may include at least one of a history of user action-specific or present behavior of the user.

The at least one processor may be configured to generate a recommendation message for the optimal feature as at least one of an image, text, or audio by using a machine learning model using the optimal feature and the current context as an input.

The at least one processor may be configured to control the user interface to output a user's learning process for the optimal feature based on the optimal feature and the user-specific parameter.

The electronic device may further include a communicator configured to perform communication with an external electronic device. The at least one processor may be configured to control the communicator to transmit a recommendation message for the optimal feature to the external electronic device.

The at least one processor may be configured to determine the optimal domain from the plurality of domains by using a machine learning model using the current context as an input.

The at least one processor may be configured to, in response to receiving a query from a user, determine a historical context corresponding to the query, and determine a past optimal feature, which is recommended in accordance with the historical context, as the optimal feature.

In accordance with another aspect of the disclosure, a control method of an electronic device is provided. The method includes a user interface, the method including determining an optimal domain from a plurality of domains based on a current context, combining the current context and a historical context of the optimal domain to determine a combined context, determining an optimal feature from a plurality of features based on the combined context and a parameter of the optimal domain, and controlling the user interface to output a recommendation message for the optimal feature.

The determination of the optimal feature may include determining a probability of each of the plurality of features based on the combined context and the parameter of the optimal domain, and determining a feature, which has a highest probability among features having a probability higher than a threshold value, as the optimal feature.

The method may further include determining the parameter of the optimal domain based on the combined context and the optimal domain.

The determination of the optimal feature may include distinguishing at least one unused feature that corresponds to the optimal domain from the plurality of features and has no usage history, redistributing a probability of each of the plurality of features to determine a probability of the at least one unused feature, and determining an unused feature, which has a highest probability among unused features having a probability higher than the threshold value, as the optimal feature.

The determination of the optimal feature may include determining the feature, which has the highest probability among the plurality of features, as the optimal feature in response to determining that a probability of at least one feature from the plurality of features is higher than the threshold value, updating the probability of each of the plurality of features based on a past optimal feature, which is previously recommended, in response to determining that the plurality of features is lower than the threshold value, and determining the feature having the highest probability as the optimal feature.

The controlling of the user interface to output the recommendation message for the optimal feature may include determining at least one of an image output mode, a text output mode, or an audio output mode as an optimal mode based on the optimal feature and user-specific parameters, and controlling the user interface to output a recommendation message for the optimal feature according to the optimal mode.

The user specific-parameters may include at least one of a history of user action-specific or present behavior of the user.

The controlling of the user interface to output the recommendation message for the optimal feature may include generating a recommendation message for the optimal feature as at least one of an image, text, or audio by using a machine learning model using the optimal feature and the current context as an input.

The method may further include controlling the user interface to output a user's learning process for the optimal feature based on the optimal feature and the user-specific parameters.

The electronic device may further include a communicator configured to perform communication with an external electronic device. The method may further include controlling the communicator to transmit a recommendation message for the optimal feature to the external electronic device.

The determination of the optimal feature may include determining the optimal domain from the plurality of domains by using a machine learning model using the current context as an input.

The method may further, in response to receiving a query from a user, determining a historical context corresponding to the query, and determining a past optimal feature, which is recommended in accordance with the historical context, as the optimal feature.

Advantageous Effects

It is possible to analyze user's current behavior as well as historical behavior so as to enhance a probability of recommendation of features that are contextually relevant, and to efficiently display the features to a user to improve user experience and utilize the enhancement of the features.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 4A-1, 4A-2, 4B, 4C, and 4D are views illustrating an optimal feature controller of an electronic device recommending an optimal feature to a user according to various embodiments of the disclosure;

Throughout the drawings, it should be noted that like reference numbers are used to depict the same or similar elements, features, and structures.

MODES OF THE INVENTION

Figure 1:
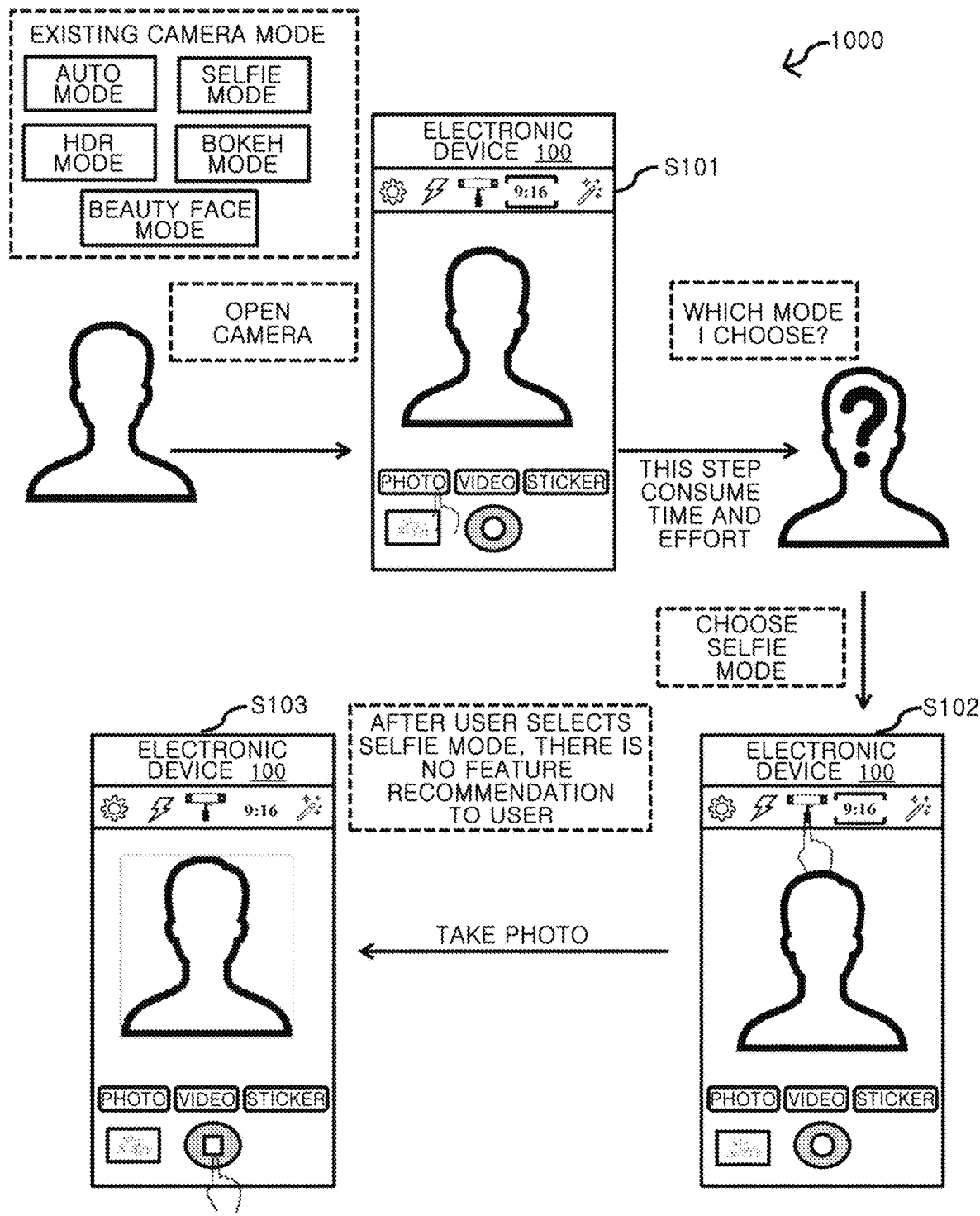
FIG. 1 is a view illustrating a system of the related art providing a manual feature selection associated with an application of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when an element is referred to as being "connected" another element, it can be directly or indirectly connected to the other element, wherein the indirect connection includes "connection via a wireless communication network".

In addition, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, or the like, may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following description, terms, such as "unit", "part", "block", "member", and "module" indicate a unit for processing at least one function or operation. For example, those terms may refer to at least one process processed by at least one hardware, such as a field programmable gate array (FPGA), an application specific integrated circuit (ASIC), at least one software stored in a memory or a processor.

An identification code is used for the convenience of the description but is not intended to illustrate the order of each operation. The each operation may be implemented in the order different from the illustrated order unless the context clearly indicates otherwise.

Hereinafter various embodiments of the disclosure will be described with reference to the accompanying drawings.

Embodiments herein disclose a method for recommending an optimal feature to a user of the electronic device. The method includes determining, by the electronic device, a current context of the electronic device and at least one user input on the electronic device. Further, the method includes extracting, by the electronic device, a plurality of domains of the electronic device from the current context and the at least one user input on the electronic device. Further, the method includes applying, by the electronic device, a machine learning model on the current context and the at least one user input on the electronic device to determine an optimal domain from the plurality of domains of the electronic device. Further, the method includes automatically recommending, by the electronic device, the optimal feature from a plurality of features on a display of the electronic device based on the determined optimal domain, the current context, and the at least one user input on the electronic device.

Hereinafter various embodiments of the disclosure will be described with reference to FIGS. 1 to 8C.

FIG. 1 is a view illustrating a system 1000 of the related art providing a manual feature selection associated with an application of an electronic device 100 according to an embodiment of the disclosure.

Referring to FIG. 1, the electronic device 100 may be a smartphone, a laptop, a desktop, a smart watch, or a smart TV, but is limited thereto.

At operation S101, a user of the electronic device 100 wants to take a Selfie by using one of camera applications of the electronic device 100. The user of the electronic device 100 opens the camera application, and the camera application displays various camera modes associated with the camera application. The camera mode may include an auto mode, a selfie mode, a high dynamic range (HDR) mode, a bokeh mode, and a beauty face mode.

At operation S102, the user of the electronic device 100 selects the Selfie mode to take the Selfie, and a process thereof may be manual and time-consuming. The system 1000 does not provide any recommendation (best mode to select) to the user of the electronic device 100.

At operation S103, the user of the electronic device 100 selects the Selfie mode and takes the Selfie with a shutter button of the camera application. When using the camera application's shutter button, the electronic device 100 may shake and thus the quality of the Selfie may reduce. The system 1000 does not provide any feature recommendation (e.g., use palm Selfie) to the user of the electronic device 100 to avoid shakiness. Therefore, an intelligent solution/method/system capable of providing a better user experience is required.

Figure 2:
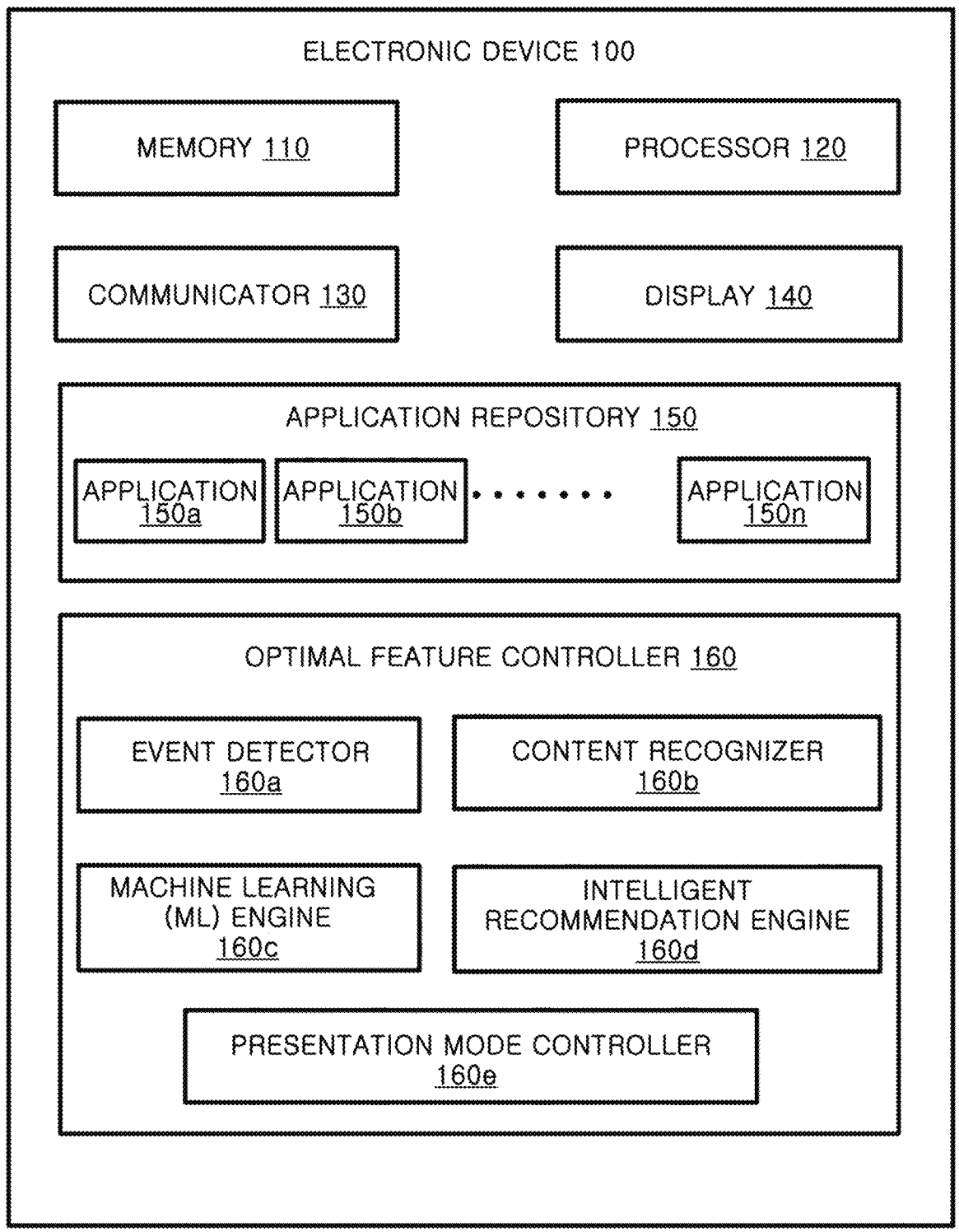
FIG. 2 is a block diagram illustrating an electronic device according to an embodiment of the disclosure.

FIG. 2 is a block diagram illustrating an electronic device according to an embodiment of the disclosure.

Referring to FIG. 2, in an embodiment of the disclosure, the electronic device 100 includes a memory 110, a processor 120, a communicator 130, a display 140, an application repository 150, and an optimal feature controller 160.

The memory 110 stores instructions to be executed by the processor 120. The memory 110 may include non-volatile storage elements. The non-volatile storage elements may include magnetic hard discs, optical discs, floppy discs, flash memories, or forms of electrical programmable memories (EPROM) or electrical erasable and programmable (EEPROM) memories. In addition, in some examples, the memory 110 may be considered a non-transitory storage medium. The term "non-transitory" may indicate that the storage medium is not embodied in a carrier wave or a propagated signal. However, the term "non-transitory" should not be interpreted that the memory 110 is non-movable. In certain examples, a non-transitory storage medium may store data that may, over time, change (e.g., in a random access memory (RAM) or cache). In an embodiment of the disclosure, the memory 110 may be an internal storage unit or may be an external storage unit of the electronic device 100, the application repository 150 (interchangeably used as application 150), a cloud storage, or any other type of external storage.

The processor 120 communicates with the memory 110, the communicator 130, the display 140, the application 150, and the optimal feature controller 160. The processor 120 is configured to execute instructions stored in the memory 110 and to perform various processes.

The communicator 130 may communicate with an external electronic device. For this, the communicator 130 may include a wired communication module and a wireless communication module.

The display 140 may display a recommendation message for an optimal feature, and for this, the display 140 may be including a known type of display panel. Further, the electronic device 100 may further include a speaker (not shown) configured to output a recommendation message for an optimal feature, and the speaker may operate as a user interface together with the display 140.

The application 150 may be a camera application, a call application, a game application, a business application, an education application, a lifestyle application, an entertainment application, a utilities application, a travel application, a health-fitness application, or a food application.

In an embodiment of the disclosure, the optimal feature controller 160 includes an event detector 160a, a content recognizer 160b, a machine learning (ML) engine 160c (interchangeably used as "ML model 160c", or "machine learning model 160c)", an intelligent recommendation engine 160d, and a presentation mode controller 160e.

In this case, the optimal feature controller 160 may include at least one processor, and may be provided as a separate processor from the processor 120 or integrated with the processor 120.

Each of the event detector 160a, the content recognizer 160b, the ML engine 160c, the intelligent recommendation engine 160d, and the presentation mode controller 160e may include at least one processor. According to embodiments of the disclosure, the event detector 160a, the content recognizer 160b, the ML engine 160c, the intelligent recommendation engine 160d, and the presentation mode controller 160e may share a processor with a different component.

The optimal feature controller 160 may determine an optimal domain from a plurality of domains based on the current context.

More particularly, the optimal feature controller 160 may determine an optimal domain from a plurality of domains by using a machine learning model using a current context as an input.

For example, the optimal feature controller 160 may score whether each of the plurality of domains matches the current context of the electronic device 100 using the machine learning model, and determine the domain having the highest score as the optimal domain.

For example, when the current context indicates that the user takes a Selfie, the optimal feature controller 160 may determine the camera as the optimal domain.

The optimal feature controller 160 may combine the current context and a historical context of the optimal domain so as to determine the combined context, and the optimal feature controller 160 may determine an optimal feature from the plurality of features based on the combined context and a parameter of the optimal domain.

For example, the optimal feature controller 160 may consider not only the current context but also a historical context as an analysis target so as to apply a usage history to determining the optimal feature. The optimal feature controller 160 may identify a feature that is not used by the user based on the combined context.

The optimal feature controller 160 may identify a feature capable of improving deteriorated parameters based on the parameter of the optimal domain. For example, the optimal feature controller 160 may determine a required probability for each unused feature based on the parameters of the optimal domain, and may determine the unused feature having a highest probability as the optimal feature.

The optimal feature controller 160 may control a user interface to output a recommendation message for the optimal feature. Accordingly, the user may be recommended the most necessary feature in the current context, and the utilization of the electronic device 100 may be increased by executing the recommended feature.

The event detector 160a detects at least one user input on the electronic device 100.

The content recognizer 160b may determine the current context of the electronic device 100. The context may correspond to operation information of the electronic device 100 and may include logs, activity information, or sensor values in text format.

Further, the content recognizer 160b extracts a plurality of domains of the electronic device 100 from the current context and the at least one user input on the electronic device 100.

The domain may correspond to different fields of the electronic device 100 classified by an operation content, such as a camera, a phone, a keyboard, and Bluetooth.

Further, the content recognizer 160b combines the current context and the historical context of the determined optimal domain. Further, the content recognizer 160b determines a plurality of optimal domain-specific parameters based on the combined context and the optimal domain.

The optimal domain-specific parameter may correspond to a parameter specific to the optimal domain. For example, the optimal domain-specific parameter may correspond to a parameter of the optimal domain and may be a parameter associated with the operation content of the optimal domain. For example, when the optimal domain is a camera, parameters of the optimal domain may include image blur quality, and a degree of shake during taking a photo.

The ML engine 160c determines an optimal domain from the plurality of domains of the electronic device 100 based on the current context and the at least one user input on the electronic device 100. Further, the ML engine 160c ranks each domain from the plurality of domains based on the current context and the at least one user input. Further, the ML engine 160c selects at least one domain, which has a value higher than a threshold value, as the optimal domain from the plurality of domains.

For example, the ML engine 160c may determine the optimal domain from the plurality of domains based on the current context (which may include a user input according to embodiments). In this case, the optimal domain may be a domain most corresponding to the current context. For example, if the user is taking a Selfie, the camera may be determined as the optimal domain.

The ML engine 160c may determine the optimal domain from the plurality of domains by using the machine learning model having the current context as an input.

The ML engine 160c may be implemented through one of linear regression, logistic regression, decision tree, support vector machine (SVM), naive bayes, k-nearest neighbors (kNN), K-Means, random forest, dimensionality reduction algorithms, or gradient boosting algorithms, but is not limited thereto.

The intelligent recommendation engine 160d determines the probability of each feature from the plurality of features of the electronic device 100 based on the plurality of optimal domain-specific parameters and the combined context. In this case, the probability of the specific feature may be a probability that the specific feature is required in the current context, and may correspond to a ratio of the necessity of the specific feature based on a plurality of features.

Further, the intelligent recommendation engine 160d determines at least one unused feature from the plurality of features of the determined optimal domain. Further, the intelligent recommendation engine 160d ranks the probability of each feature from the plurality of features of the electronic device 100 based on the determined optimal domain and the at least one unused feature. Further, the intelligent recommendation engine 160d determines whether the probability of the at least one feature from the plurality of features is higher than the threshold value.

For example, the intelligent recommendation engine 160d may determine at least one unused feature that corresponds to the optimal domain among the plurality of features and has no usage history, and determine the probability of at least one unused feature by redistributing the probability of each of the plurality of features. Accordingly, the intelligent recommendation engine 160d determines an unused feature, which has the highest probability among unused features having a probability higher than the threshold value, as the optimal feature.

Further, in response to determining that at least one feature from the plurality of features is higher than the threshold value, the intelligent recommendation engine 160d selects at least one feature having the highest rank from the plurality of features as the at least one optimal feature for a recommendation to the user of the electronic device 100. For example, the intelligent recommendation engine 160d may determine a feature, which has the highest probability among features having a probability higher than the threshold value, as the optimal feature.

Further, in response to determining that at least one feature from the plurality of features is lower than the threshold value, the intelligent recommendation engine 160d updates the probability of at least one feature based on at least one past recommendation, and selects at least one feature having the highest probability as the at least one optimal feature for the recommendation to the user of the electronic device 100. In other words, in response to determining that the plurality of features is lower than the threshold value, the intelligent recommendation engine 160d may update the probability of each of the plurality of features based on the past optimal feature, which is previously recommended, and determine a feature having the highest probability as the optimal feature.

Further, the intelligent recommendation engine 160d automatically recommends the optimal feature associated with at least one of at least one application 150 of the electronic device 100 and at least one-second electronic device 200 based on an optimal mode. For example, when the electronic device 100 determines an optimal feature for the second electronic device 200 corresponding to the external electronic device, the electronic device 100 may control the communicator 130 to transmit a recommendation message for the optimal feature to the second electronic device 200.

In this case, the optimal mode may be at least one of an image output mode, a text output mode, and an audio output mode, and may be determined based on the optimal feature and user-specific parameters. The user specific-parameter may include at least one of a history of user action-specific and present behavior of the user.

The presentation mode controller 160e determines the optimal mode for recommendation to the user of the electronic device 100 using the ML model 160c.

The presentation mode controller 160e generates a recommendation message for the optimal feature as at least one of an image, text, or audio by using the ML model 160c using the optimal feature and the current context as an input.

Further, the presentation mode controller 160e generates the image output associated with the at least one of the optimal feature based on the at least one of the optimal feature, and the current context of the electronic device 100.

Further, the presentation mode controller 160e generates the text output associated with the at least one of the optimal feature based on the at least one of the optimal feature, and the current context of the electronic device 100.

Further, the presentation mode controller 160e generates the audio output associated with the at least one of the optimal feature based on the at least one of the optimal feature, and the current context of the electronic device 100.

Further, the presentation mode controller 160e detects at least one of the at least one optimal feature of the at least one application 150 of the electronic device 100 and the at least one optimal feature of the at least one-second electronic device 200.

Further, the presentation mode controller 160e selects at least one of the image output mode, the text output mode, and the audio output mode as the optimal mode for recommending the optimal feature to the user of the electronic device 100 based on the optimal feature, and user-specific parameters.

In an embodiment of the disclosure, the presentation mode controller 160e selects the at least one of the image output mode, the text output mode, and the audio output mode as the optimal mode so as to enhance the chance of acceptance of the optimal feature present in the electronic device 100.

For example, the presentation mode controller 160e may determine at least one of the image output mode, the text output mode, or the audio output mode as the optimal mode based on the optimal feature and user-specific parameters, and control the user interface to output a recommendation message for the optimal feature according to the optimal mode.

Further, the presentation mode controller 160e may control the user interface to output a user's learning process for the optimal feature based on the at least one optimal feature and the user-specific parameters.

In an embodiment of the disclosure, the optimal feature controller 160 is configured to receive at least one query from the at least one application 150 of the electronic device 100. Further, the optimal feature controller 160 is configured to map the at least one query with the historical context of the at least one past recommendation so as to obtain the at least one optimal feature. The optimal feature controller 160 is configured to automatically recommend the at least one optimal feature to the user of the electronic device 100 based on the mapping.

For example, in response to receiving the query from the user, the optimal feature controller 160 may determine the historical context corresponding to the query, and determine a past optimal feature, which is recommended in accordance with the historical context, as a current optimal feature.

At least one of the plurality of modules/components (i.e., the event detector 160a, the content recognizer 160b, the ML engine 160c, the intelligent recommendation engine 160d, and the presentation mode controller 160e) may be implemented through an artificial intelligence (AI) model. A feature associated with AI may be performed through memory 110 and the processor 120.

The processor 120 may include one or a plurality of processors. In this case, one or a plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU).

The one or a plurality of processors controls the processing of the input data in accordance with a predefined operating rule or artificial intelligence (AI) model stored in the non-volatile memory and the volatile memory. The predefined operating rule or artificial intelligence model is provided through training or learning.

Being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may include a plurality of neural network layers. Each layer includes a plurality of weight values and performs a layer operation through calculation of a previous layer and an operation of a plurality of weights. Neural networks may include convolutional neural network (CNN), deep neural network (DNN), recurrent neural network (RNN), restricted boltzmann machine (RBM), deep belief network (DBN), bidirectional recurrent deep neural network (BRDNN), generative adversarial networks (GAN), and deep Q-networks, but is not limited thereto.

The learning process is a method for training a predetermined target device (for example, a robot) using a plurality of learning data to cause, allow, or control the target device to make a determination or prediction. Learning processes may include supervised learning, unsupervised learning, semi-supervised learning, or reinforcement learning, but is not limited thereto.

In supervised learning processes, a target/outcome variable (or dependent variable) which is to be predicted from a given set of predictors (independent variables) is present. Using the set of variables, a function that map inputs to desired outputs (i.e., automatically recommending the optimal feature) is generated. The training process (optimal mode learning process) continues until the model achieves a desired level of accuracy on the training data. Supervised learning may include regression, decision tree, random forest, K-nearest neighbors (KNN), and logistic regression.

In unsupervised learning processes, any target/outcome variable to predict/estimate is not present. The unsupervised learning process is used for clustering population in different groups (domain, current context, user input, and features), which is widely used for segmenting in different groups for specific intervention. Unsupervised learning may include Apriori algorithm, and K-means.

In reinforcement learning processes, a machine (the optimal feature controller 160) is trained to make specific decisions (recommending optimal feature). The reinforcement learning process is operated in such a way that the machine is exposed to an environment where the machine trains itself continually using trial and error. The machine learns from past experience (historical context) and tries to capture the best possible knowledge to make accurate business decisions (recommending optimal feature). Reinforcement learning may include Markov Decision Process.

Although the FIG. 2 illustrates various hardware components of the electronic device 100, it is to be understood that other embodiments are not limited thereon. In other embodiments of the disclosure, the electronic device 100 may include less or more number of components. Further, the labels or names of the components are used only for illustrative purpose and does not limit the scope of the disclosure. One or more components may be combined together to perform same or substantially similar function for recommending the optimal feature to the user of the electronic device 100.

Figure 3A:
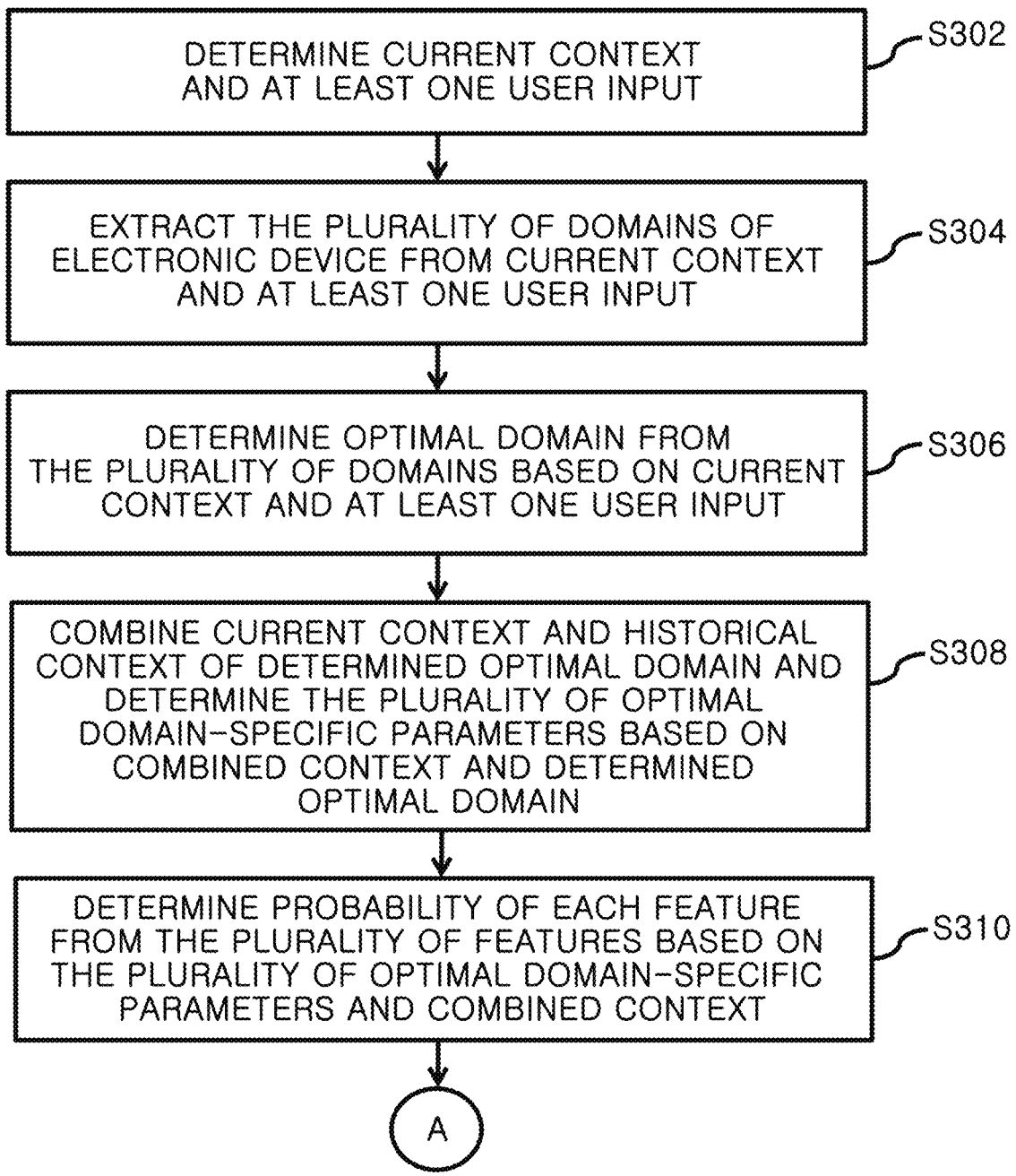
FIGS. 3A and 3B are flowcharts illustrating various operations in which an electronic device recommends an optimal feature to a user according to various embodiments of the disclosure.
Figure 3B:
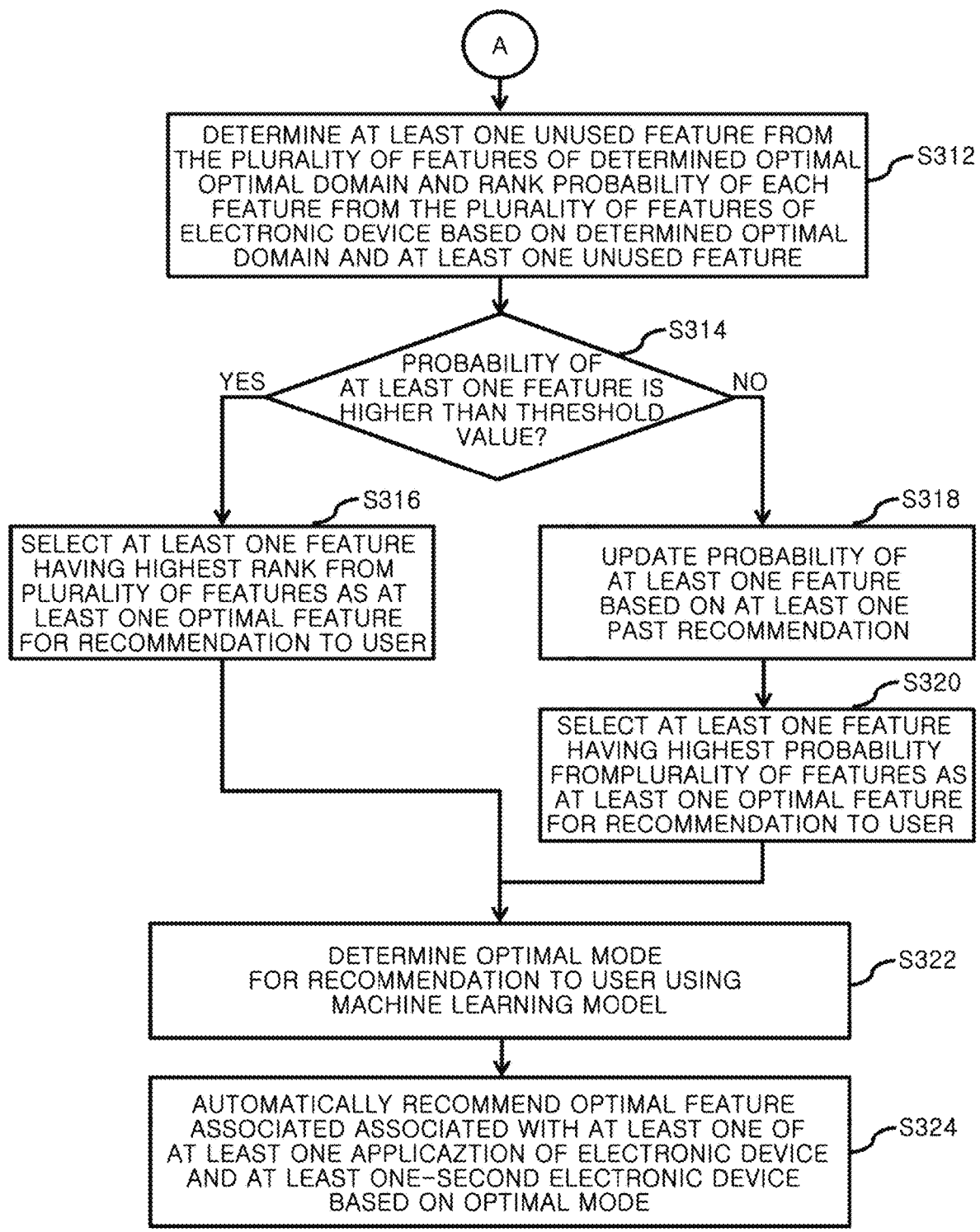

FIGS. 3A and 3B are flowcharts illustrating various operations in which an electronic device 100 recommends an optimal feature to a user according to various embodiments of the disclosure. Operations S302 to S324 are performed by the optimal feature controller 160.

Referring to FIGS. 3A and 3B, the electronic device 100 may determine the current context of and the at least one user input at operation S302.

At operation S304, the electronic device 100 may extract the plurality of domains of the electronic device 100 from the current context and the at least one user input.

At operation S306, the electronic device 100 may determine the optimal domain from the plurality of domains based on the current context and the at least one user input. According to embodiments of the disclosure, the current context may include information about the user input. In this case, the electronic device 100 may determine the optimal feature from the plurality of domains based on the current context.

At operation S308, the electronic device 100 may combine the current context and the historical context of the determined optimal domain, and determine the plurality of optimal domain-specific parameters based on the combined context and the determined optimal domain. For example, the electronic device 100 may determine the parameter of the optimal feature based on the combined context and the determined optimal domain.

At operation S310, the electronic device 100 may determine the probability of each feature from the plurality of features based on the plurality of optimal domain-specific parameters and the combined context.

At operation S312, the electronic device 100 may determine at least one unused feature from the plurality of features of the determined optimal domain, and rank the probability of each feature from the plurality of features of the electronic device 100 based on the determined optimal domain and the at least one unused feature.

At operation S314, the electronic device 100 may determine whether the probability of the at least one feature from the plurality of features is higher than the threshold value.

At operation S316, the electronic device 100 may select at least one feature having the highest rank from the plurality of features as the at least one optimal feature for the recommendation to the user in response to determining that at least one feature from the plurality of features is higher than the threshold value. For example, the electronic device 100 may determine a feature, which has the highest probability among features having the probability higher than the threshold value, as the optimal feature.

At operation S318, the electronic device 100 may update the probability of at least one feature based on at least one past recommendation in response to determining that at least one feature from the plurality of features is lower than the threshold value.

At operation S320, the electronic device 100 may select at least one feature having the highest probability as the at least one optimal feature for the recommendation to the user.

At operation S322, the electronic device 100 may determine the optimal mode for recommendation to the user using the ML model 160c.

At operation S324, the electronic device 100 may automatically recommend the optimal feature associated with at least one of the at least one application 150 of the electronic device 100 and at least one-second electronic device 200 based on the optimal mode.

FIGS. 4A-1, 4A-2, 4B, 4C, and 4D are views illustrating an optimal feature controller of an electronic device 100 recommends an optimal feature to a user according to various embodiments of the disclosure.

Referring to FIGS. 4A-1, 4A-2, 4B, 4C, and 4D, the context recognizer 160b includes a context extractor 160ba, a context analyzer and domain mapping engine 160bb, a context merger 160bc, and a domain-specific parameter extraction engine 160bd. The intelligent recommendation engine 160d includes a feature recommendation engine 160da, and a feature probability pruning engine 160db.

At operation S402, the context extractor 160ba tracks the activities, intents, and notifications that are invoked over time and extracts a relevant context from all the available input units and stores the extracted relevant context in a context storage unit (i.e., the memory 110) in form of stacks of text blocks. For example, the user takes a Selfie by using a camera application 150a. In this case, the context extractor 160ba determines a current context 402a (i.e., a relevant context from all the available input units) associated with the camera application 150a and the other applications 150b-150n and/or features associated with the electronic device 100 over time, and stores the current context 402a in the memory 110.

At operation S404, the context analyzer and domain mapping engine 160bb analyses the current context's 402a stacks continuously and classifies the current context's 402a stacks into a set of pre-defined domains 404a (e.g., a camera, Bluetooth™, a keyboard, and music) with a confidence score for each domain and also sends an inference trigger signal whenever a particular domain score exceeds a threshold value (e.g., highest domain score>threshold value (50)). For example, in response to the camera domain confidence score being 60, the context analyzer and domain mapping engine 160bb selects the camera domain as the optimal domain.

More particularly, the context analyzer and domain mapping engine 160bb may determine the optimal domain from the plurality of domains by using the machine learning model using the current context as an input.

For example, the context analyzer and domain mapping engine 160bb may score whether each of the plurality of domains matches the current context of the electronic device 100 using the machine learning model, and determine the domain having the highest score as the optimal domain.

For example, in response to the current context indicating that the user takes a Selfie, the context analyzer and domain mapping engine 160bb may determine the camera as the optimal domain Based on the optimal domain, the context analyzer and domain mapping engine 160bb determines a historical domain-specific context 404c form a historical domain wise context storage 404b (i.e., the memory 110). For example, the context analyzer and domain mapping engine 160bb may determine the historical context 404c corresponding to the optimal domain.

At operation S406, the context merger 160bc combines the current context 402a and the historical domain-specific context 404c as a combined context 406a. For example, the combined context 406a may include a current operation of the electronic device 100 but also a past usage history.

At operation S408, the domain-specific parameter extraction engine 160bd determines the plurality of optimal domain-specific parameters 408a based on the combined context 406a and the determined optimal domain 404a.

The optimal domain-specific parameter 408a may correspond to a parameter specific to the optimal domain. For example, the optimal domain-specific parameter 408a may correspond to a parameter of the optimal domain and may be a parameter associated with the operation content of the optimal domain. For example, when the optimal domain is a camera, parameters of the optimal domain may include image blur quality, and a degree of shake (sensor movement) during taking a photo.

For example, the domain-specific parameter extraction engine 160bd may extract past and present parameters corresponding to the optimal domain 404a from the combined context 406a.

At operation S410, the feature recommendation engine 160da determines a probability of each feature 410a from the plurality of features of the electronic device 100 based on the plurality of optimal domain-specific parameters 408a and the combined context 406a.

For example, the feature recommendation engine 160da may identify a feature capable of improving deteriorated parameters based on the parameter of the optimal domain. For example, the optimal feature controller 160 may determine a required probability for each feature in the combined context based on the parameters of the optimal domain.

At operation S412, the feature probability pruning engine 160db obtains feature usage data 412a and domain scores of the determined optimal domain 404a as an input, and prunes (ranks) the feature probabilities 412b by removing the probabilities that have been used and also those that are from a different domain (not optimal domain) and redistributes the probability in a weighted manner among the unused domain features to increase the probability of prediction.

For example, the feature probability pruning engine 160db may exclude a feature that does not correspond to the optimal domain and a feature that corresponds to the optimal domain, but the user has already used, from a probability list (pruning), and redistribute a probability of the excluded feature to each of unused features in a weighted manner so as to increase the probability of prediction.

In other words, the feature probability pruning engine 160*db* may determine at least one unused feature that corresponds to the optimal domain among the plurality of features and has no usage history, and determine the probability of at least one unused feature by redistributing the probability of each of the plurality of features.

At operation S414, the feature probability pruning engine 160*db* determines whether the probability of the at least one feature from the plurality of features is higher than the threshold value.

Figures 1, 4A:
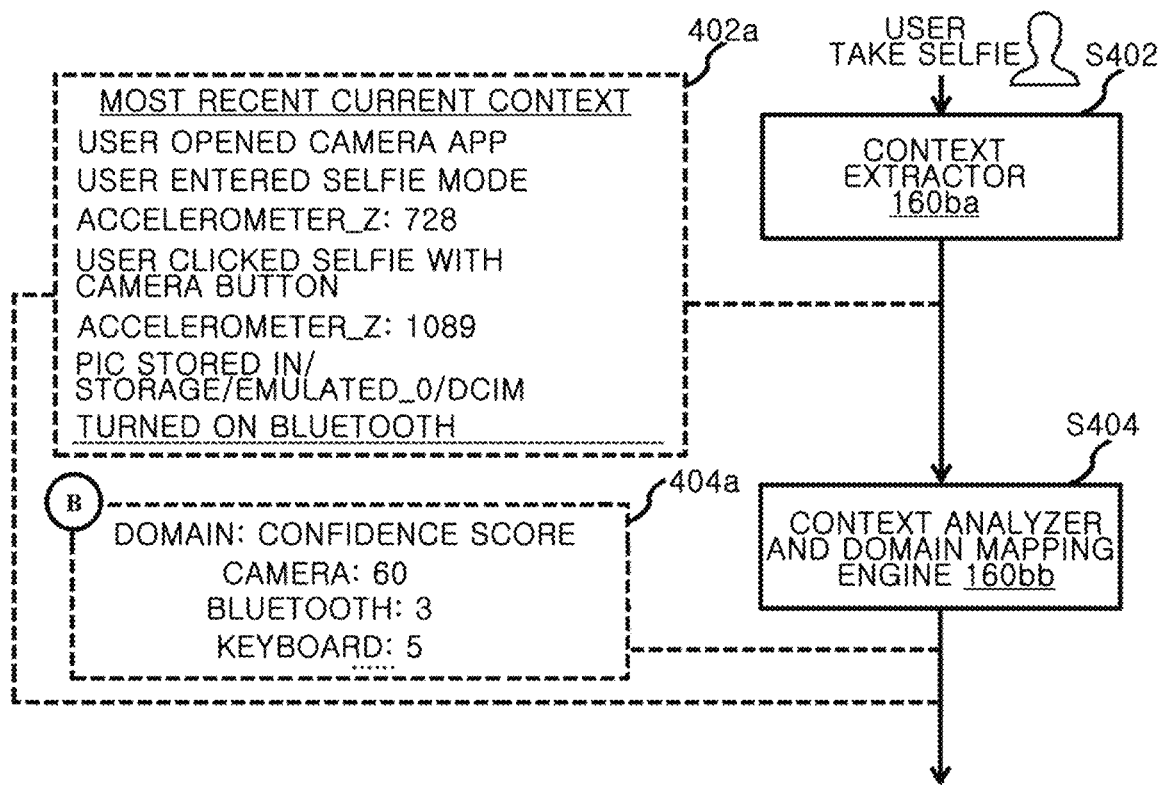
Figures 2, 4A:
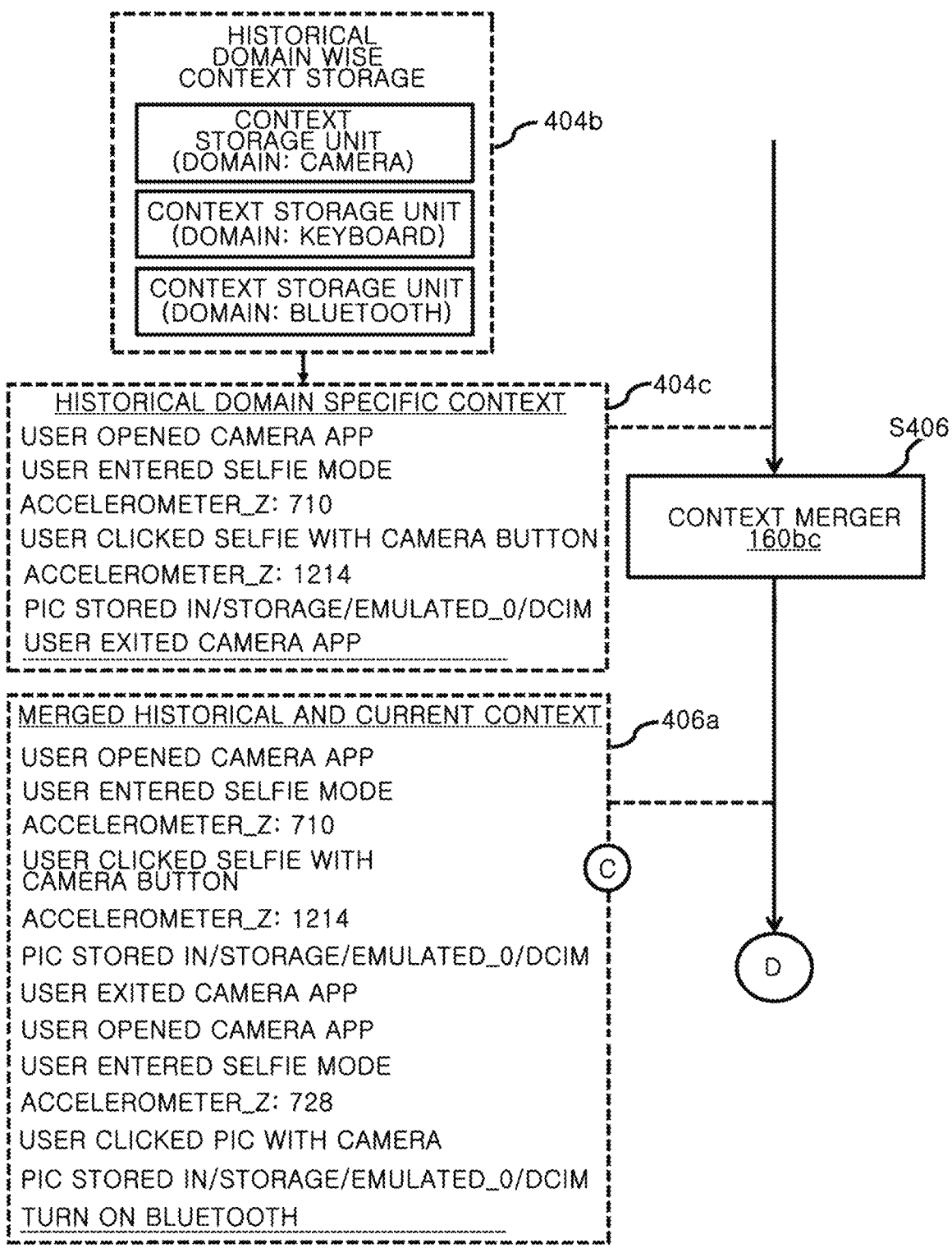
Figure 4B:
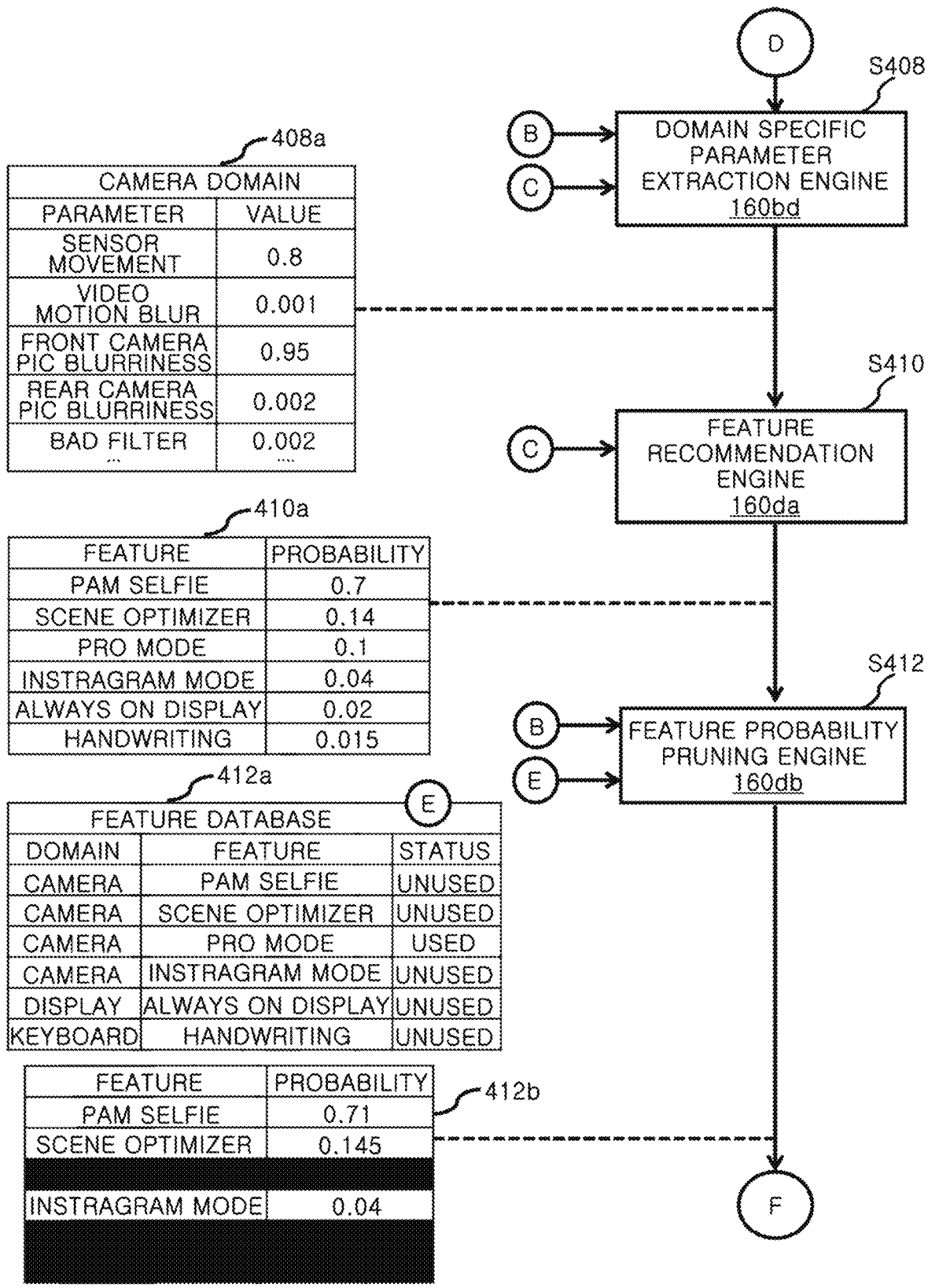
Figure 4C:
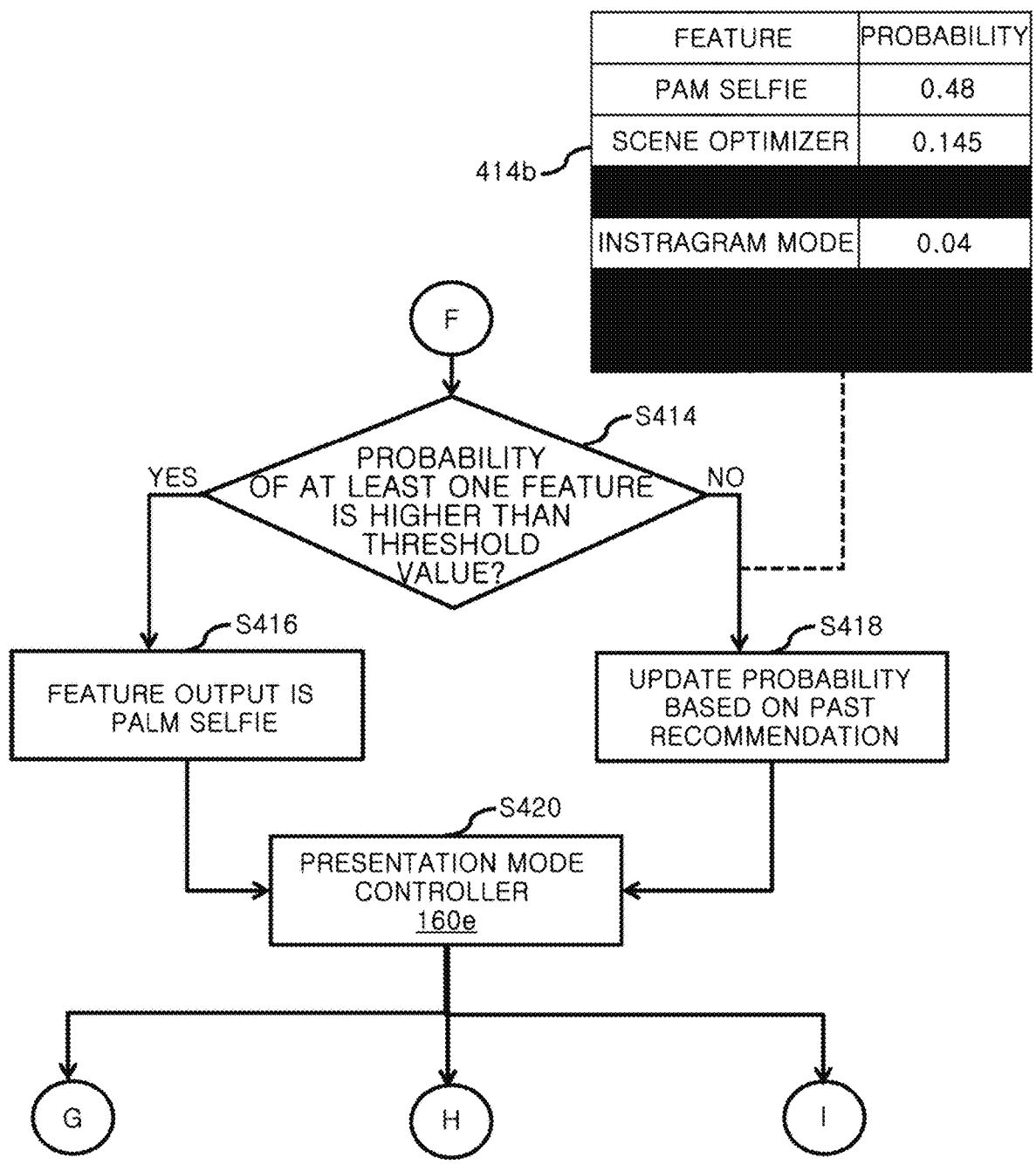
Figure 4D:
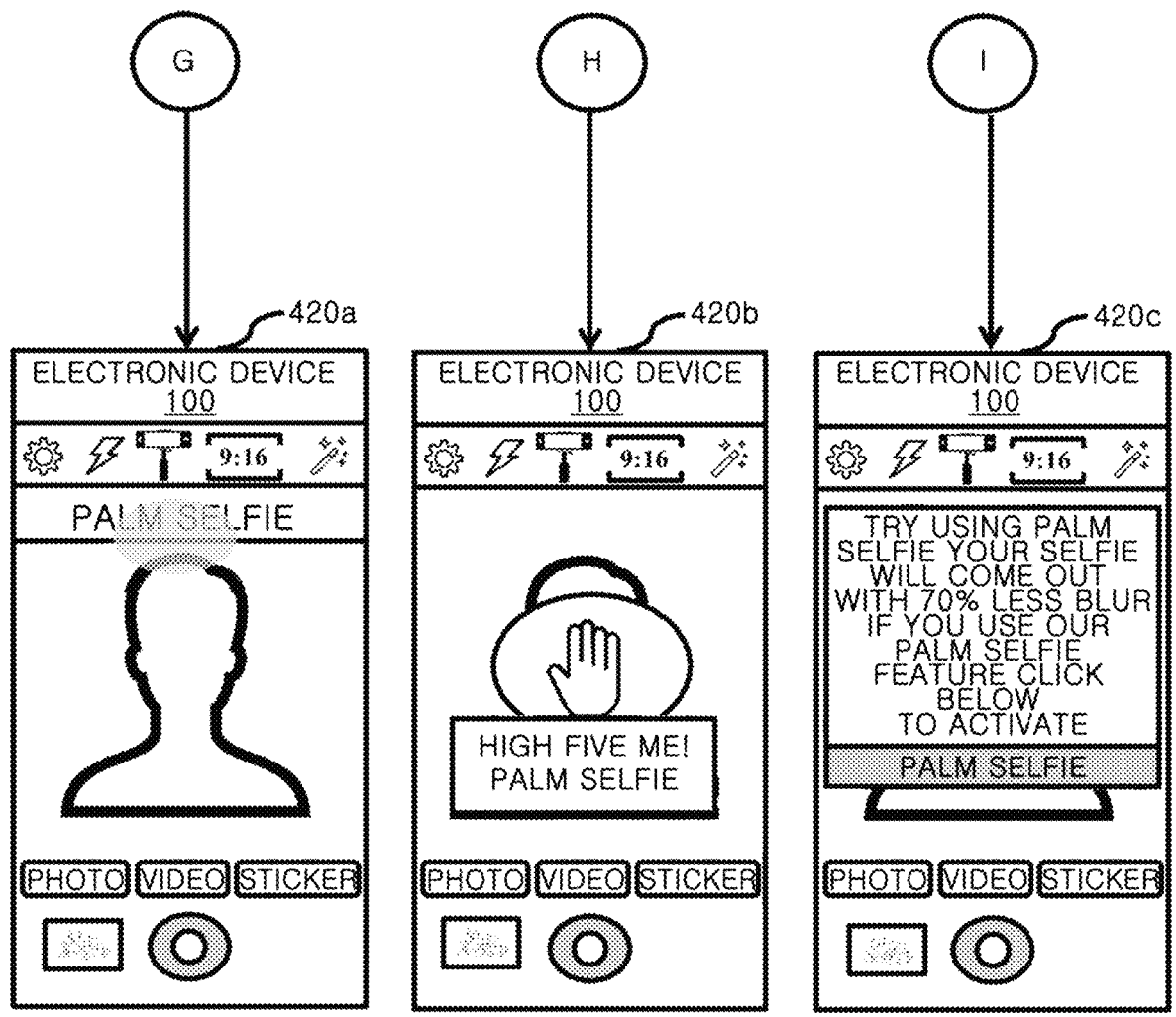

At operation S416, the feature probability pruning engine 160*db* selects at least one feature having the highest rank (e.g., palm Selfie (0.71), as shown in FIG. 4B at 412*b*) from the plurality of features as the at least one optimal feature for the recommendation to the user of the electronic device 100 in response to determining that a probability of at least one feature from the plurality of features is higher than the threshold value. For example, the feature probability pruning engine 160*db* may determine a feature, which has the highest probability among features having a probability higher than the threshold value, as the optimal feature.

At operation S418, the feature probability pruning engine 160*db* updates the probability of at least one feature based on at least one past recommendation in response to determining that at least one feature having the highest rank (e.g., palm selfie (0.48), as shown in FIG. 4B at 414*b*) from the plurality of features is lower than the threshold value, and selects at least one feature having the highest probability (updated probability) as the at least one optimal feature for the recommendation to the user of the electronic device 100.

For example, in response to determining that at least one feature from the plurality of features is lower than the threshold value, the feature probability pruning engine 160*db* may update the probability of at least one feature based on at least one past recommendation, and select at least one feature having the highest probability as the at least one optimal feature for the recommendation to the user of the electronic device 100. In other words, in response to determining that the plurality of features is lower than the threshold value, the intelligent recommendation engine 160*d* may update the probability of each of the plurality of features based on the past optimal feature, which is previously recommended, and determine a feature having the highest probability as the optimal feature.

At operation S420, the presentation mode controller 160*e* determines the optimal mode for recommendation to the user of the electronic device 100. For example, the presentation mode controller 160*e* may determine a mode for outputting the recommendation message for the optimal feature, and the electronic device 100 may control the user interface to output the recommendation message for the optimal feature according to the determined optimal mode. In other words, the presentation mode controller 160*e* may select at least one of the visual output 420*a*, the image output 420*b*, the text output 420*c*, and the audio output as the optimal mode based on the at least one optimal feature, and user-specific parameters. The details of determining the optimal mode will be described again with reference to FIG. 5.

Figure 5:
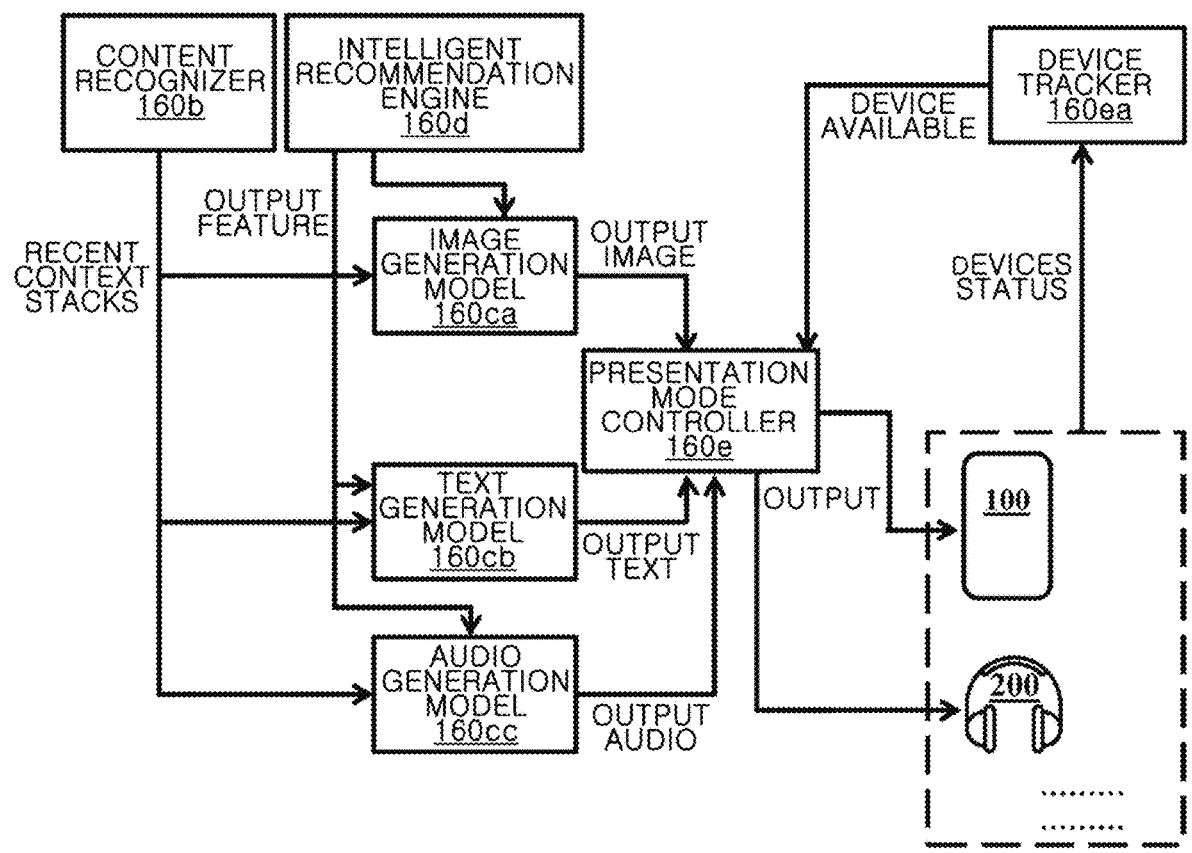
FIG. 5 is a flowchart illustrating an electronic device outputting a recommendation message, which is for an optimal feature generated by a machine learning model, to a user according to an embodiment of the disclosure.

FIG. 5 is a flowchart illustrating an electronic device 100 outputting a recommendation message for an optimal feature generated by the ML model 160*c* to a user according to an embodiment of the disclosure.

Referring to FIG. 5, the ML model 160*c* includes an image generation model 160*ca*, a text generation model 160*cb*, and an audio generation model 160*cc*.

The image generation model 160*ca* generates the image output associated with the at least one of the optimal feature based on the at least one of the optimal feature recommended by the intelligent recommendation engine 160*d*, and the current context (e.g., recent context stacks) recognized by the content recognizer 160*b*.

The text generation model 160*cb* generates the text output associated with the at least one of the optimal feature based on the at least one of the optimal feature recommended by the intelligent recommendation engine 160*d*, and the current context recognized by the content recognizer 160*b*.

The audio generation model 160*cc* generates the audio output associated with the at least one of the optimal feature based on the at least one of the optimal feature recommended by the intelligent recommendation engine 160*d*, and the current context recognized by the content recognizer 160*b*.

Further, the image generation model 160*ca*, the text generation model 160*cb*, and the audio generation model 160*cc* correspond to image and graphics interchange format (GIF), text and audio modes which are neural generative models.

Further, the image generation model 160*ca* determines most recent context text and outputs the image specifying details of the feature in a comprehensible way. The image generation model 160*ca* first takes word embeddings of the recent context text blocks and forward through the stacked convolutional up sampling (transpose convolutional) layers to generate an output image or sequence of images (GIF).

Similarly, the audio generation model 160*cc* and the text generation model 160*cb* convert a context text to embeddings and forward through recurrent layers to generate an output audio and an output text respectively.

The presentation mode controller 160*e* merges outputs from the generation models 160*ca*, 160*cb*, and 160*c* of the determined optimal modes and provides the merged output to the selected device 100 or 200.

Further, the presentation mode controller 160*e* may perform monitoring a device tracker 160*ea*. Further, the device tracker 160*ea* detects at least one of the at least one optimal feature of at least one application 150 of the electronic device 100 (e.g., a smart phone) and the at least one optimal feature of the at least one-second electronic device 200 (e.g., a headphone).

For example, when the optimal feature is an audio feature, the presentation mode controller 160*e* redirects the audio feature to an audio device 200 in response to the connection between the audio device 200 and the electronic device 100. When the optimal feature is a visual feature (e.g., an image, or a text), the presentation mode controller 160*e* displays the visual feature on the screen of the electronic device 100 in a most efficient manner to enhance the acceptance of the features (e.g., audio feature or visual feature) associated with the electronic device 100 and/or the at least one-second electronic device 200 connected to the electronic device 100. Further, the presentation mode controller 160*e* selects at least one of the image output, the text output, and the audio output as the optimal mode for recommendation to the user of the electronic device 100 based on the at least one optimal feature, and user-specific parameters.

The device tracker 160*ea* selects the output terminal device 100 and/or 200 with an output interface to recommend the optimal feature based on recommended type of feature (e.g., audio feature, or visual feature) and interaction behavior of the user of the electronic device 100 with the devices 100 and/or 200. It is based on the selected device 100 and/or 200 and the optimal feature to be recommended by the presentation mode controller 160e.

The electronic device 100 may control the communicator 130 to transmit the recommendation message for the optimal feature to the external electronic device 200 based on the output of the device tracker 160ea.

Figure 6:
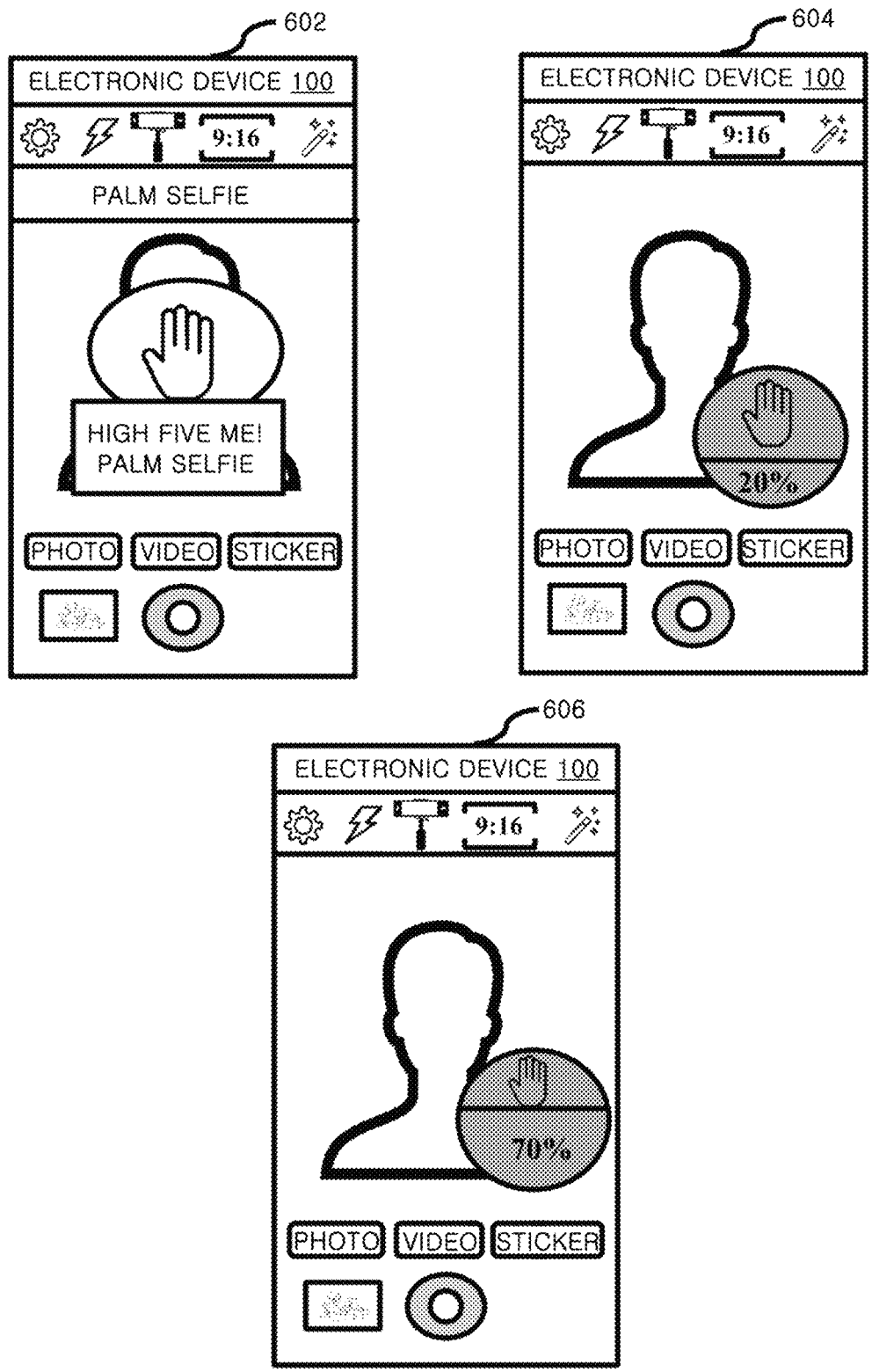
FIG. 6 is a view illustrating a state in which an electronic device displays a learning process about a user's optimal feature based on at least one optimal feature, and user-specific parameters according to an embodiment of the disclosure.

FIG. 6 is a view illustrating a state in which an electronic device 100 displays a learning process about a user's optimal feature based on at least one optimal feature, and user-specific parameters according to an embodiment of the disclosure.

Referring to FIG. 6, in an embodiment of the disclosure, the electronic device 100 may output a user's learning process for the optimal feature based on the optimal feature and the user-specific parameters.

For example, at operation 602, the optimal feature controller 160 recommends the image output as the optimal feature and displays the image output on the electronic device 100.

At operation 604, the optimal feature controller 160 detects the same scenario occurs twice but the feature is not recommended again and the user uses the feature once and not the second time. In this case, the optimal feature controller 160 displays an intuitive learning curve (e.g., 20%) on the electronic device 100.

At operation 606, the optimal feature controller 160 detects that the same scenario repeats. When the user of the electronic device 100 uses the same feature, the optimal feature controller 160 updates the progress (e.g., 70%) and in response to the corresponding feature reaching a high recall value, the optimal feature controller 160 may not display a progress curve indicator.

For example, the electronic device 100 may display a learning curve in which the progress increases as the user uses the pre-recommended optimal feature in the same context, and when the user uses the optimal feature to a certain level, the electronic device 100 may not display the learning curve.

Accordingly, the user can learn the necessary features in a specific context, and can visually confirm his/her learning.

Figure 7:
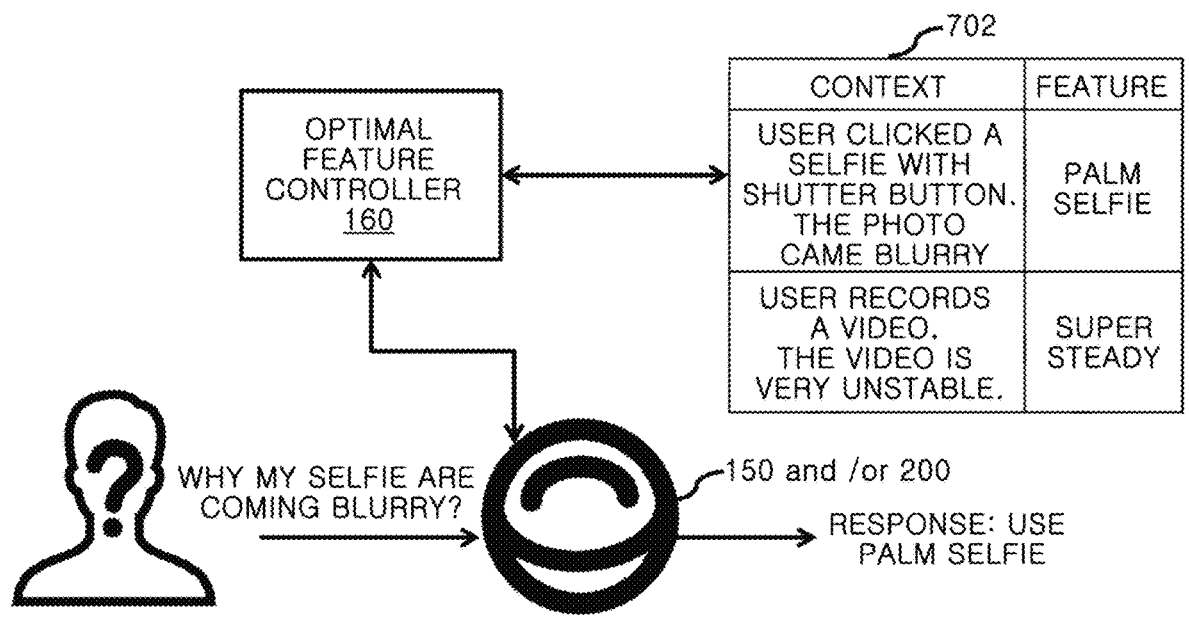
FIG. 7 is a view illustrating an electronic device determining an optimal feature for recommendation to a user by integrating at least one application according to an embodiment of the disclosure.

FIG. 7 is a view illustrating an electronic device 100 determining an optimal feature for recommendation to a user by integrating at least one application 150 according to an embodiment of the disclosure.

Referring to FIG. 7, the at least one application 150 (e.g., Bixby) of the electronic device 100 and/or the second electronic device 200 (e.g., voice assistance) may receive at least one query from the user of the electronic device 100.

Further, the electronic device 100 maps the at least one query with the historical context 702 of the at least one past recommendation to obtain the at least one optimal feature by using the optimal feature controller 160.

Further, the at least one application 150 and/or the second electronic device 200 automatically recommends the at least one optimal feature to the user of the electronic device 100 based on the mapping.

For example, in response to receiving the query from the user, the electronic device 100 may determine the historical context corresponding to the query, and determine a past optimal feature, which is recommended in accordance with the historical context, as the optimal feature.

Figure 8A:
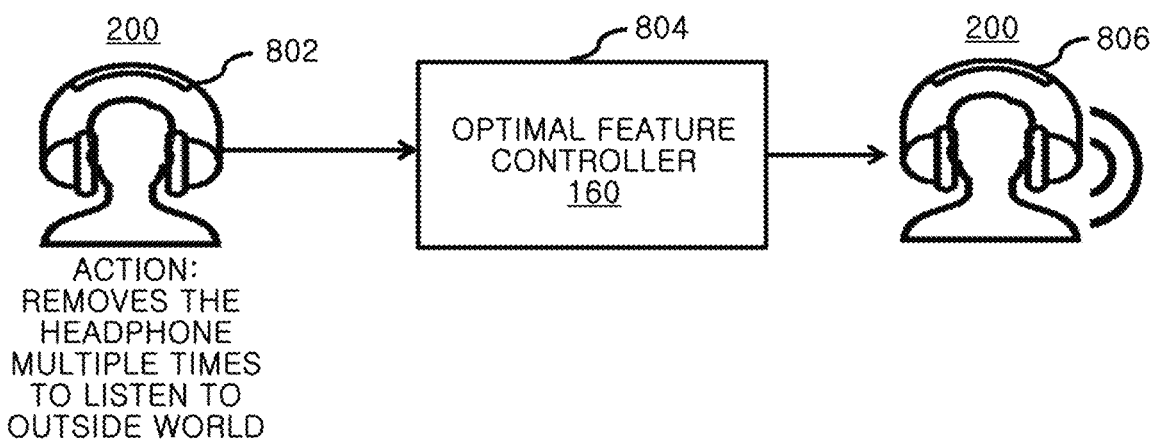
FIGS. 8A, 8B, and 8C are views illustrating an electronic device recommending an optimal feature to a user according to various embodiments of the disclosure.
Figure 8B:
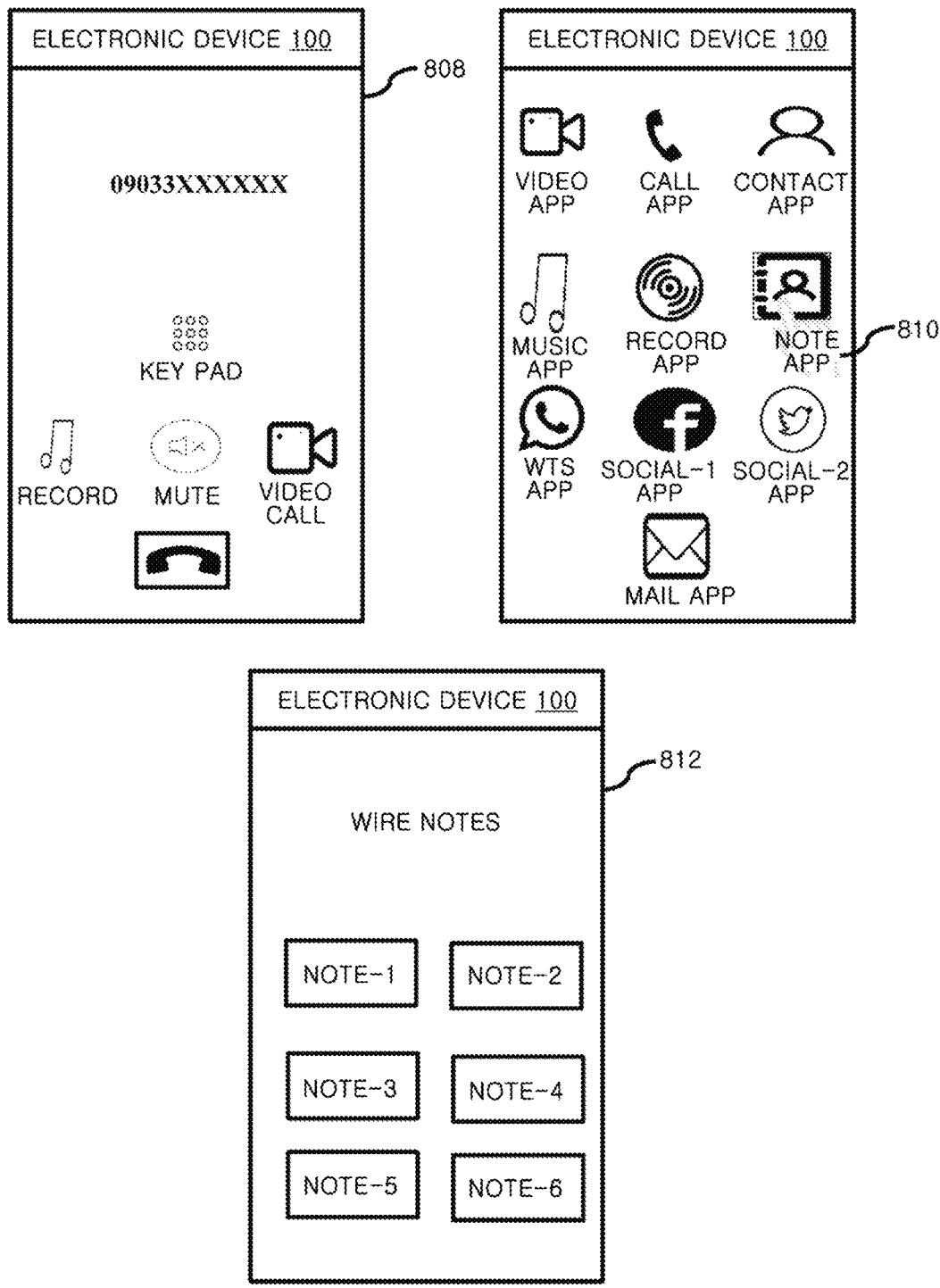
Figure 8C:
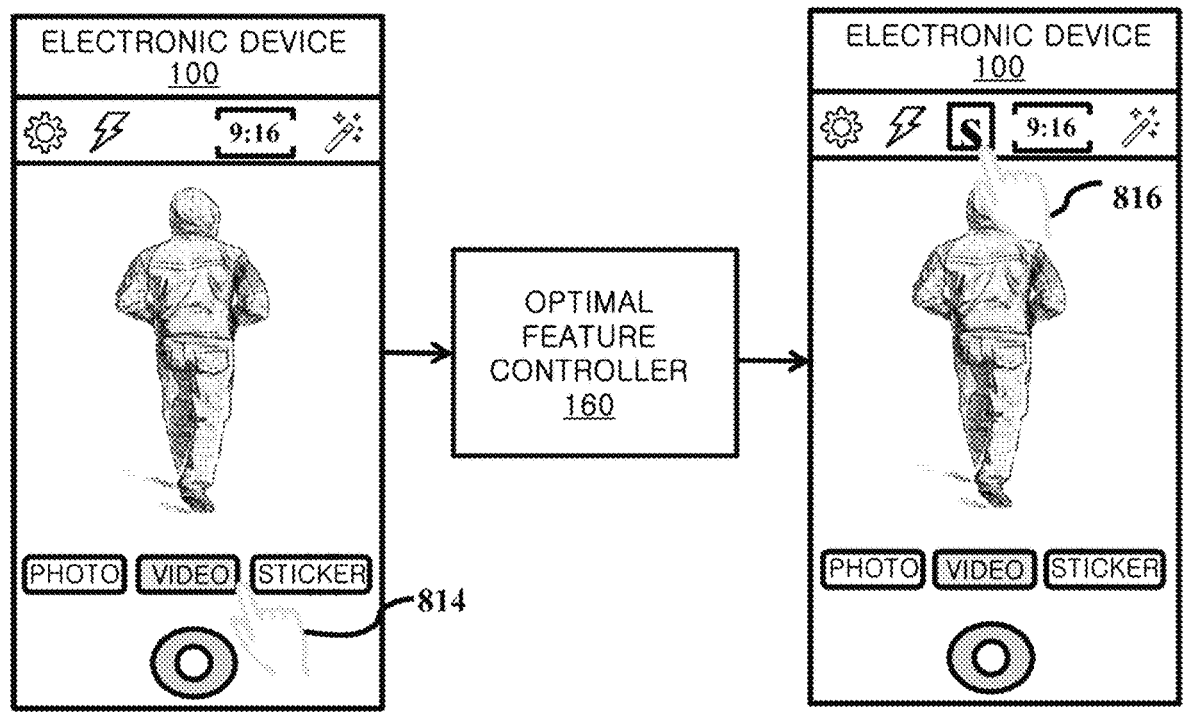

FIGS. 8A, 8B, and 8C are views illustrating an electronic device 100 recommends an optimal feature to a user according to various embodiments of the disclosure.

Referring to FIG. 8A, it illustrates a scenario in which the user of the electronic device 100b (e.g., a mobile phone) is listening music 802 through the second electronic device 200 (e.g., a headphone) and the second electronic device 200 is wirelessly connected to the electronic device 100.

The user of the electronic device 100 removes the headphone 200 multiple times to listen to outside world, and this event is detected 804 by the optimal feature controller 160. In response to determining the event 806, the optimal feature controller 160 provides a demo of "ambient sound" feature to the headphone 200. The optimal feature controller 160 provides music with ambient sound feature or provides music without ambient sound feature so as to differentiate clarity of ambient sound. Therefore, the proposed system provides better user experience.

Referring to FIG. 8B, it illustrates a scenario in which the user of the electronic device 100 communicates over a call 808, and during the calling, the user of the electronic device 100 needs to write down some message for future reference.

In this situation, in existing system 810, the user of the electronic device 100 manually searches for a note application 150 and write down the message 812.

As for the proposed method, the optimal feature controller 160 automatically recommend the note application 150 on the display of the electronic device 100. Therefore, the proposed system provides better user experience.

Referring to FIG. 8C, it illustrates a scenario in which the user of the electronic device 100 is recording a video 814 while walking/running, which leads to shakiness, and thus the quality of the video reduces.

In this situation, in existing system, the user of the electronic device 100 manually searches for a stability feature of the camera application 150.

As for the proposed method 816, the optimal feature controller 160 automatically recommends the stability feature of the camera application 150 on the display of the electronic device 100. Therefore, the proposed system provides better user experience.

In an embodiment of the disclosure, even when the electronic device 100 has more and more functionalities/features but many functions are unused by the user of the electronic device 100, the proposed method is very useful. Furthermore, the optimal feature controller 160 makes recommendations based on the current context also (by extracting problems faced by the user of the electronic device 100/need of feature) rather than based on the historical context. Therefore, the proposed method is beneficial in recommending features that were never used and are not known to the user of the electronic device 100.

In an embodiment of the disclosure, the optimal feature controller 160 recognizes a scenario/difficulty faced by the user of the electronic device 100, determines need of available functionalities/features, and recommends the feature at relevant instances. Therefore, the user of the electronic device 100 can feel useful without irritation. Furthermore, the difficulty may not happen exactly as before. The proposed disclosure suits in any scenario as there is no hard-coded checking of occurrence of the same scenario.

Furthermore, the optimal feature controller 160 displays learning progress for the user of the electronic device 100 based on usage of the recommended feature and instances to allow the user of the electronic device 100 to be motivated to use the unused feature and to learn the scenarios.

In an embodiment of the disclosure, the proposed method supports multiple electronic devices 100 and 200 and modes associated with each electronic device 100 and 200. Accordingly, recommendations may be liked by the user of the electronic device 100. Furthermore, the proposed method provides a platform for device assistant (e.g., Bixby, and S Finder) for retrieving features to answer search queries of the user of the electronic device 100. Therefore, the device assistants become more intelligent and requires less computation power and retrieves features faster.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a read only memory (ROM), a random access memory (RAM), a magnetic tape, a magnetic disk, a flash memory, and an optical data storage device.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
memory storing one or more computer programs;
a user interface; and
at least one processor communicatively coupled to the memory and the user interface,
wherein the one or more computer programs include computer-executable instructions that, when executed by the at least one processor individually or collectively, cause the electronic device to:
determine an optimal domain from a plurality of domains based on a current context,
combine the current context and a historical context of the optimal domain to determine a combined context,
determine an optimal feature from a plurality of features based on the combined context and a parameter of the optimal domain, and
output, via the user interface, a recommendation message for the optimal feature, and
wherein, to determine the optimal feature, the one or more computer programs include computer-executable instructions that, when executed by the at least one processor individually or collectively, cause the electronic device further to:
determine a probability of each of the plurality of features based on the combined context and the parameter of the optimal domain,
determine a plurality of unused features from the plurality of features of the determined optimal domain, wherein the plurality of unused features are features with no usage history,
redistribute the determined probability of each of the plurality of features to produce a redistributed probability of each of the plurality of features to increase a probability of each of the plurality of unused features,
based on the redistributed probability of at least one unused feature being higher than a threshold, determine an unused feature which has a highest redistributed probability among the plurality of unused features, as the optimal feature, and based on the redistributed probability of each of the plurality of unused features being lower than a threshold:
update the redistributed probability of each of the plurality of unused features based on a past optimal feature, which is previously recommended, and
determine an unused feature, which has a highest updated probability among the plurality of unused features, as the optimal feature.

2. The electronic device of claim 1, wherein the one or more computer programs further include computer-executable instructions that, when executed by the at least one processor individually or collectively, cause the electronic device to:
determine the parameter of the optimal domain based on the combined context and the optimal domain.

3. The electronic device of claim 1, wherein the one or more computer programs further include computer-executable instructions that, when executed by the at least one processor individually or collectively, cause the electronic device to:
determine at least one of an image output mode, a text output mode, or an audio output mode as an optimal mode based on the optimal feature and user-specific parameters, and
control the user interface to output the recommendation message for the optimal feature according to the optimal mode.

4. The electronic device of claim 3, wherein the user-specific parameters comprise at least one of a history of user action-specific or present behavior of a user.

5. The electronic device of claim 3, wherein the one or more computer programs further include computer-executable instructions that, when executed by the at least one processor individually or collectively, cause the electronic device to:
generate the recommendation message for the optimal feature as at least one of an image, text, or audio by inputting the optimal feature and the current context into a machine learning model.

6. The electronic device of claim 3, wherein the one or more computer programs further include computer-executable instructions that, when executed by the at least one processor individually or collectively, cause the electronic device to:
control the user interface to output a user's learning process for the optimal feature based on the optimal feature and the user-specific parameters.

7. The electronic device of claim 1, further comprising:
a communicator configured to perform communication with an external electronic device,
wherein the one or more computer programs further include computer-executable instructions that, when executed by the at least one processor individually or collectively, cause the electronic device to:
control the communicator to transmit the recommendation message for the optimal feature to the external electronic device.

8. The electronic device of claim 1, wherein the one or more computer programs further include computer-executable instructions that, when executed by the at least one processor individually or collectively, cause the electronic device to:
determine the optimal domain from the plurality of domains by inputting the current context into a machine learning model.

9. The electronic device of claim 1, wherein, to determine the optimal feature, the one or more computer programs further include computer-executable instructions that, when executed by the at least one processor individually or collectively, cause the electronic device to:
in response to receiving a query from a user, determine a historical context corresponding to the query, and determine a past optimal feature, which is recommended in accordance with the historical context, as the optimal feature.

10. A method performed by an electronic device comprising a user interface, the method comprising:
determining, by the electronic device, an optimal domain from a plurality of domains based on a current context;
combining, by the electronic device, the current context and a historical context of the optimal domain to determine a combined context;
determining, by the electronic device, an optimal feature from a plurality of features based on the combined context and a parameter of the optimal domain; and
output, by the electronic device via the user interface, a recommendation message for the optimal feature,
wherein the determining of the optimal feature comprises:
determining, by the electronic device, a probability of each of the plurality of features based on the combined context and the parameter of the optimal domain;
determining, by the electronic device, a plurality of unused features from the plurality of features of the determined optimal domain, wherein the plurality of unused features are features with no usage history;
redistributing, by the electronic device, the determined probability of each of the plurality of features to produce a redistributed probability of each of the plurality of features to increase a probability of each of the plurality of unused features;
based on the redistributed probability of at least one unused feature being higher than a threshold, determining, by the electronic device, an unused feature, which has a highest redistributed probability among the plurality of unused features, as the optimal feature; and
based on the redistributed probability of each of the plurality of unused features being lower than a threshold:
updating, by the electronic device, the redistributed probability of each of the plurality of unused features based on a past optimal feature, which is previously recommended; and
determining, by the electronic device, an unused feature, which has a highest updated probability among the plurality of unused features, as the optimal feature.

11. The method of claim 10, further comprising:
determining the parameter of the optimal domain based on the combined context and the optimal domain.

12. One or more non-transitory computer-readable storage media storing one or more computer programs including computer-executable instructions that, when executed by at least one processor of an electronic device, cause the electronic device to perform operations, the operations comprising:
determining, by the electronic device, an optimal domain from a plurality of domains based on a current context;
combining, by the electronic device, the current context and a historical context of the optimal domain to determine a combined context;
determining, by the electronic device, an optimal feature from a plurality of features based on the combined context and a parameter of the optimal domain; and
output, by the electronic device via a user interface of the electronic device, a recommendation message for the optimal feature,
wherein the determining of the optimal feature comprises:
determining, by the electronic device, a probability of each of the plurality of features based on the combined context and the parameter of the optimal domain;
determining, by the electronic device, a plurality of unused features from the plurality of features of the determined optimal domain, wherein the plurality of unused features are features with no usage history:
redistributing, by the electronic device, the determined probability of each of the plurality of features to produce a redistributed probability of each of the plurality of features to increase a probability of each of the plurality of unused features;
based on the redistributed probability of at least one unused feature being higher than a threshold, determining, by the electronic device, an unused feature, which has a highest redistributed probability among the plurality of unused features, as the optimal feature; and
based on the redistributed probability of each of the plurality of unused features being lower than a threshold:
updating, by the electronic device, the redistributed probability of each of the plurality of unused features based on a past optimal feature, which is previously recommended; and
determining, by the electronic device, an unused feature, which has a highest updated probability among the plurality of unused features, as the optimal feature.

* * * * *